(12) United States Patent
Summons et al.

(10) Patent No.: US 9,248,370 B2
(45) Date of Patent: Feb. 2, 2016

(54) TARGETING SYSTEM AND METHOD FOR VIDEO GAMES

(71) Applicants: Phillip B. Summons, Littleton, CO (US); Elliot P. Summons, Centennial, CO (US)

(72) Inventors: Phillip B. Summons, Littleton, CO (US); Elliot P. Summons, Centennial, CO (US)

( * ) Notice: Subject to any disclaimer, the term of this patent is extended or adjusted under 35 U.S.C. 154(b) by 169 days.

(21) Appl. No.: 13/870,578

(22) Filed: Apr. 25, 2013

(65) Prior Publication Data

US 2013/0316821 A1 Nov. 28, 2013

(51) Int. Cl.
*A63F 13/00* (2014.01)
*A63F 9/24* (2006.01)
*A63F 13/98* (2014.01)
*A63F 13/219* (2014.01)

(52) U.S. Cl.
CPC ............... *A63F 13/00* (2013.01); *A63F 13/02* (2013.01); *A63F 13/04* (2013.01); *A63F 13/219* (2014.09); *A63F 13/98* (2014.09)

(58) Field of Classification Search
CPC ... A63F 13/219; A63F 13/53; A63F 13/5375; A63F 13/837; A63F 2300/203; A63F 2300/6045; A63F 2300/8076; A63F 13/00; A63F 13/02; A63F 13/04; A63F 13/98
USPC .......................................... 463/47, 49, 54, 56
See application file for complete search history.

(56) References Cited

U.S. PATENT DOCUMENTS

| | | | | |
|---|---|---|---|---|
| 3,014,724 A * | 12/1961 | Cryder et al. | ............... | 273/348.2 |
| 3,568,356 A * | 3/1971 | Berman | ...................... | 446/118 |
| 3,895,803 A * | 7/1975 | Loe | ............................... | 273/378 |
| 3,960,380 A * | 6/1976 | Yokoi | ............................. | 463/50 |
| 4,517,558 A * | 5/1985 | Davids | ......................... | 345/629 |
| 4,734,037 A * | 3/1988 | McClure | ....................... | 434/236 |
| 4,777,528 A * | 10/1988 | Mehrens et al. | ............. | 348/184 |
| 6,012,980 A * | 1/2000 | Yoshida et al. | .................... | 463/2 |
| 8,596,643 B1 * | 12/2013 | Edwards | ....................... | 273/378 |
| 2001/0029203 A1 * | 10/2001 | Shoji et al. | ....................... | 463/33 |
| 2003/0078105 A1 * | 4/2003 | Hao | ................................ | 463/51 |
| 2010/0047510 A1 * | 2/2010 | Couvillion | ................... | 428/66.5 |
| 2011/0067622 A1 * | 3/2011 | Harding | ........................ | 116/200 |

* cited by examiner

*Primary Examiner* — Milap Shah
(74) *Attorney, Agent, or Firm* — Perkins Coie LLP

(57) ABSTRACT

A targeting system and methods of use provide a player of a first person shooter video game with enhanced weapon targeting. Vertical and horizontal lines extend outwardly from a game reticule. In some embodiments, the vertical and horizontal lines or bands extend across the display screen. The present technology can be applied to display screens mechanically or electronically. In some embodiments an electronic device is situated between the gaming console and the display screen. In other embodiments, a piece of clear, thin-film material is cut to approximate the dimensions of the screen, with the key graphical design elements of the present invention screen printed on the piece of plastic. Static electricity may hold the film in place. In other embodiments, the film may be held in place by pressure sensitive adhesive, brackets, or the like.

4 Claims, 4 Drawing Sheets

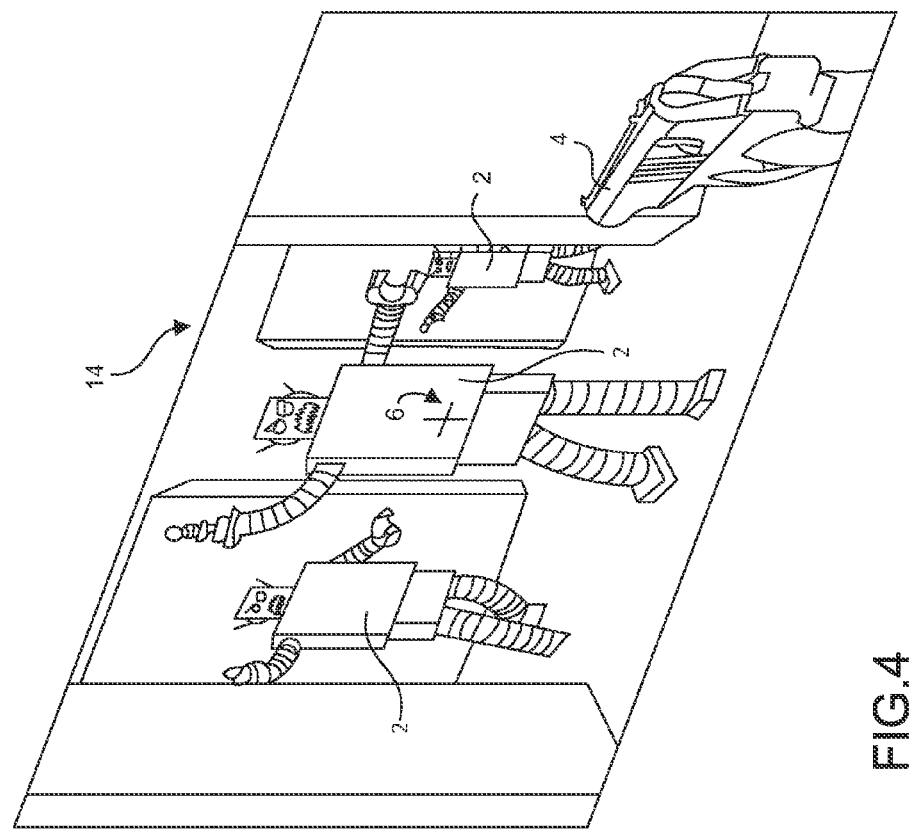
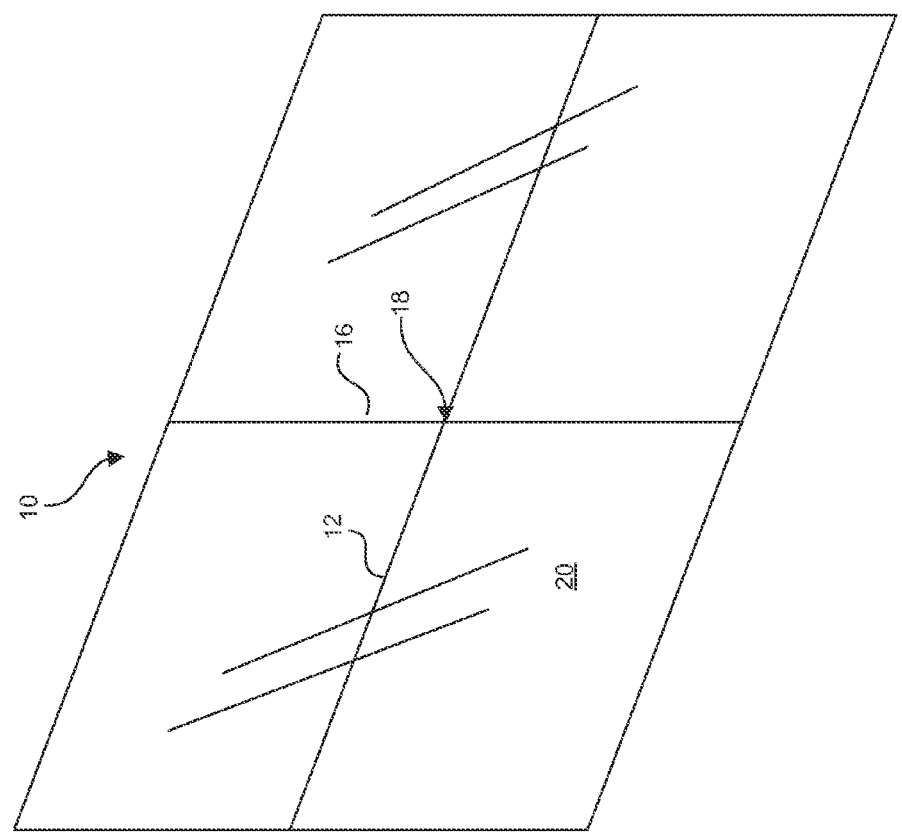
FIG.4

TARGETING SYSTEM AND METHOD FOR VIDEO GAMES

BACKGROUND

"First person shooter" games are defined as a video game genre that centers the gameplay on gun and projectile weapon-based combat through first-person perspective. An example of a "first person shooter" game can be seen in FIG. 1. A "first person shooter" presents an experience to the player that he/she is actually in the game environment. What a player can see on the television screen is what the player would theoretically be seeing if the player was actually in the game environment. Most games in this genre are based on combat. Since these games are presented in a first person perspective, and these games are based on combat, what a player would see on the television screen is the weapon 4 the player is wielding (creating the illusion that the player him/herself is holding the weapon 4), the environment that the player is theoretically in (giving the player the illusion that the player him/herself is actually in the environment), targets 2 and the reticule 6.

A reticule (also spelled reticle) is what allows the player to target enemies and objects in the game environment. A reticule is generally represented as a small (in relation to the size of the television screen) cross or circle positioned on the television screen to the left of the weapon. The reticule represents where the weapon is pointed. The player can manipulate where the reticule is (in the game environment) with the handheld game controller, giving the player the illusion that he/she is aiming the weapon. Generally, when the reticule overlaps an enemy (in the game environment), the reticule will change color, indicating to the player that his/her weapon is pointed directly at an enemy. The game controller is typically equipped with a trigger, giving the player the illusion that he/she can aim the weapon, and when the reticule changes color, the player can pull the trigger, theoretically shooting the target, and earn points in the game. The size of the reticule can change based on the kind of weapon the player is wielding. Generally, the size of the reticule will change depending on the precision of the weapon. For example, if the player is wielding a sniper rifle, since it is a high precision weapon, the reticule will be very small (in relation to the size of the television screen). If the player is wielding a low precision weapon, such as a shotgun, the reticule will be quite large (in relation to the size of the television screen). The reticule will be a primary focus of this description.

A common issue that most first person shooter players have when playing, is not being able to acquire the target as fast as the player would like in order to make a "kill" and achieve the highest score possible. It is difficult for most players to quickly move the reticule onto the target and keep the reticule on the target. Especially in combat games, like a first person shooter game, players want to be able to shoot the enemy faster than the enemy can shoot the player, so the ability to acquire the target quickly is essential to success in a first person shooter game. Players will attempt to move the reticule on to the target, and inadvertently, will either move the reticule past the target, won't move the reticule all the way to the target, or will lose sight of the reticule because something in the game environment is the same color as the reticule, so the reticule will blend in with the game environment. These kind of target acquisition problems are known as "target jitters". Target jitters occur because the reticule is so small (in relation to the entire television screen), that the player has to focus intently on the reticule, making it difficult to find the targets in the game environment. Players find it difficult to acquire targets while having to focus intently on the reticule, because most players do not have adequate peripheral vision to do both at the same time. Target jitters is a common problem, particularly with players who are beginners.

Another issue most players encounter when playing is that at times, the reticule will disappear from the players view during game play. As stated earlier, the reticule will at times blend in with the game environment. This will happen when the color of the reticule matches the color of something in the game environment. For example, if the reticule is blue, and the player is targeting something in the sky, since the sky is also blue, the reticule will seem to disappear, and the player will not be able to see where the weapon is pointed. There is another circumstance in which the reticule will disappear. The reticule represents where the weapon is pointed, and when the player is running in the game environment, the weapon is no longer being pointed, and therefore, the reticule is no longer in view. When the player stops running, and is now able to point the weapon, players have difficulty focusing back on the reticule when it re-appears.

At this time, there is not a prior art that completely addresses target jittering, or the issue of the reticule disappearing in the game environment. One prior system in the industry is called No Scope. No Scope is a clear, plastic decal that a player places right over the top of the reticule on the television screen. The No Scope, designed to look like scope crosshairs, is an estimated 4 times the size of the reticule. In most first person shooter games, players are given the ability to "zoom in" when wielding a high precision weapon, such as a sniper rifle. If a player is wielding a sniper rifle, the player can touch a button on the game controller, allowing the player to "zoom in" on a target from a considerable distance. When the player "zooms in", the game will simulate what a first person view would look like if the player was actually looking through a rifle scope. The player would see a magnified view of the target, but would not be able to see anything else in the game environment. As stated earlier, when the player is wielding a high precision weapon, the reticule is very small (in relation to the television screen). The smaller the reticule is, the more difficult it is for the player to aim the weapon at targets. A sniper rifle is designed to engage the enemy at a great distance. A sniper rifle is not designed for combat in close quarters. In a first person shooter game, it is difficult for players to shoot a sniper rifle accurately without "zooming in", because of how small the reticule is with a high precision weapon. No Scope allows the player to shoot more accurately without "zooming in", because the crosshair like decal is placed over the reticule, affectively making the small reticule much larger. No Scope does not address the issue of target jittering, or the issue of the reticule blending in with the game environment. While No Scope does make the small reticule larger, allowing the player to shoot more accurately without "zooming in", the player still has to focus on a small portion of the screen, leaving the rest of the game environment to be viewed with the players peripheral vision, making it difficult for the player to acquire other targets in the game environment. Since No Scope is a decal placed over the reticule, when the reticule disappears, there is still a reference where the reticule would be. However, the shape and design of No Scope is not the same shape and design as the reticule. With No Scope, the player has to constantly adapt between the shape of the reticule (when it disappears), and the shape of the No Scope.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present technology provides enhanced targeting for first person shooter video games. In various embodiments, vertical and horizontal lines are provided to extend outwardly from the reticule. In some embodiments, the vertical and horizontal lines or bands extend all the way the across the display screen. The width of the lines may vary depending on the size of the television screen. The color of the lines may also vary depending on the player's preference.

The elements of the present technology can be applied to the television screen mechanically or electronically. In some embodiments where this is done electronically, an electronic device is situated between the gaming console or computer, and the television screen or monitor. Various embodiments of the present technology mechanically associate the enhanced reticule with the television screen. In some such embodiments, a piece of clear, thin-film material is cut to the same or similar dimensions as the television screen, with the key graphical design elements of the present invention screen printed on the piece of plastic. Static electricity may be used to hold the film in place in some embodiments. In other embodiments, the film may be held in place by other means, such as a pressure sensitive adhesive, brackets, or other appropriate means.

The present technology allows the player to focus less on the reticule, giving the player a more reliable frame of reference to locate, acquire, target, and defeat the enemy much faster and more surely.

BRIEF DESCRIPTION OF THE DRAWINGS

FIG. 4 depicts a perspective view of the targeting system depicted in FIG. 2 in a spaced-apart relationship with the monitor and first person shooter game depicted in FIG. 1.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
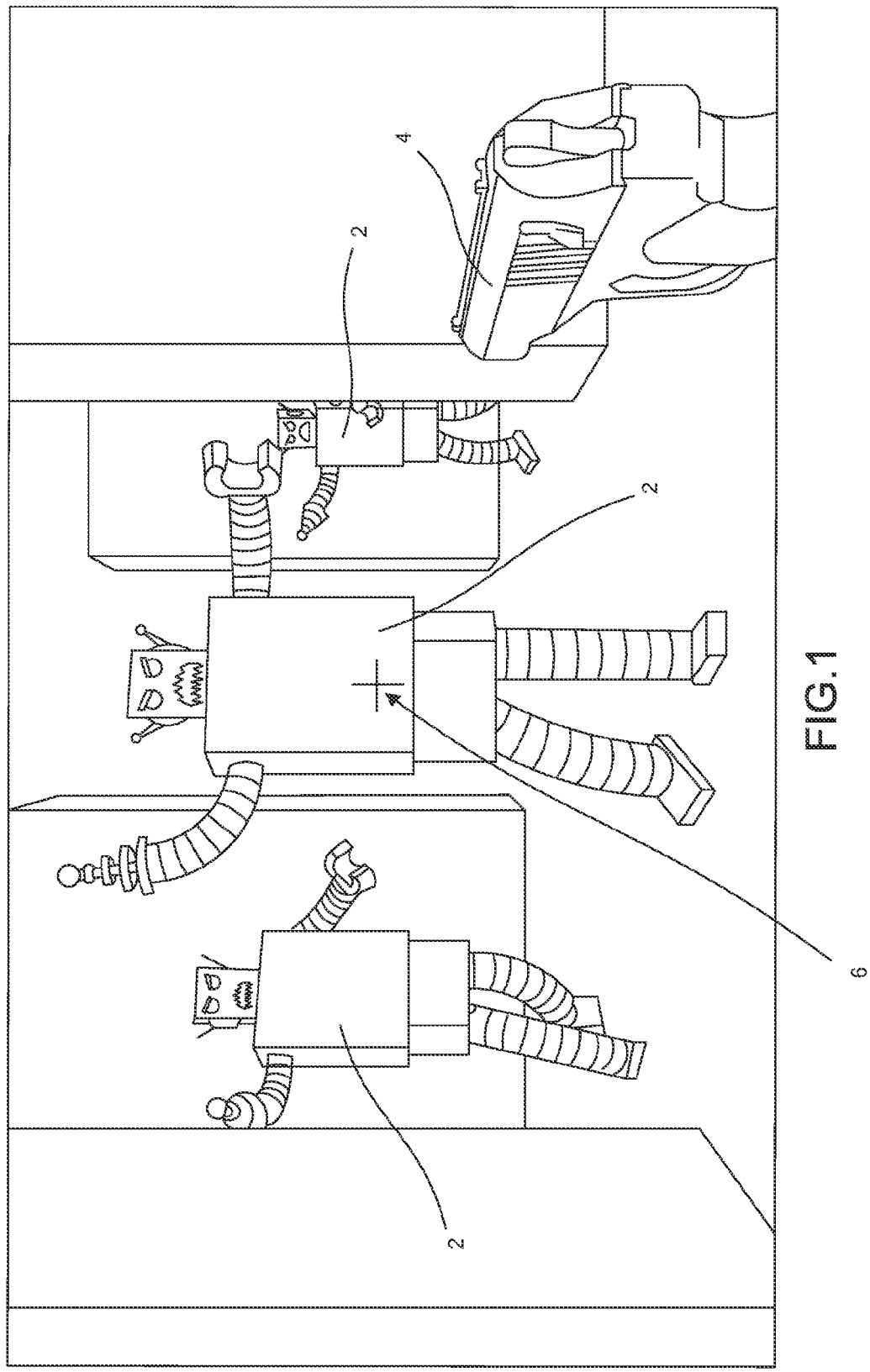
FIG. 1 depicts a monitor displaying an example of a first person shooter game.
Figure 2:
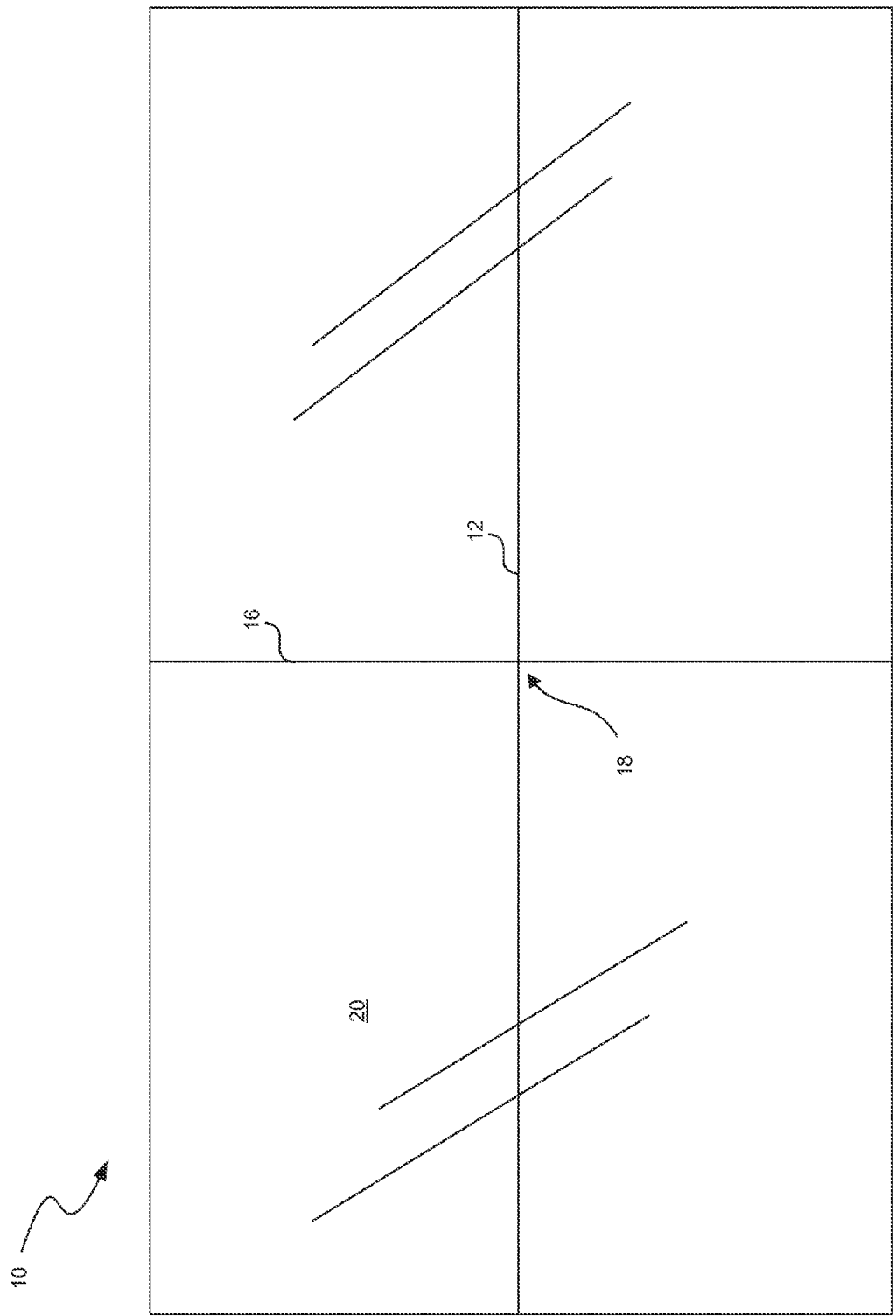
FIG. 2 depicts one embodiment of a targeting system of the present technology.
Figure 3:
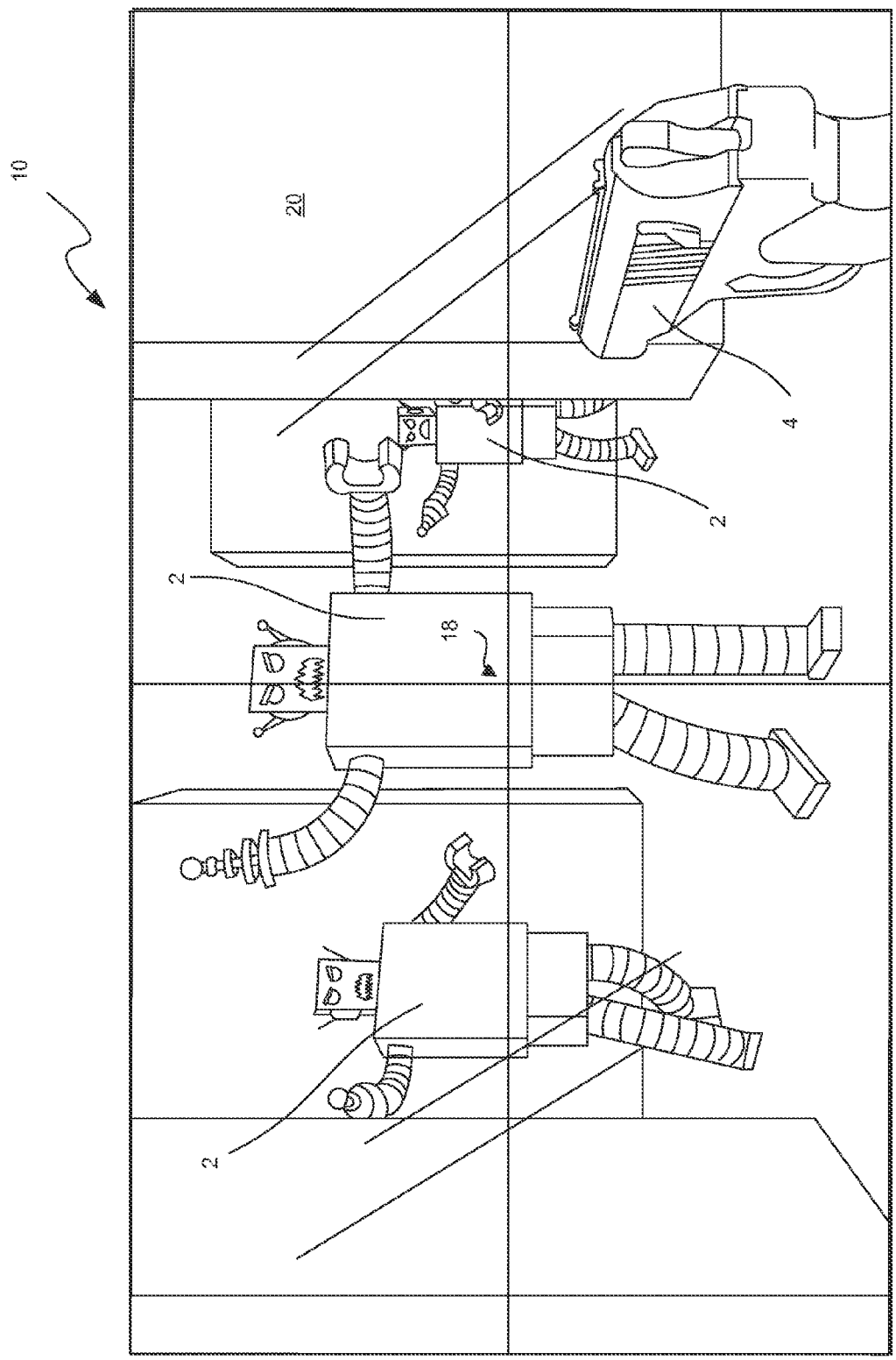
FIG. 3 depicts the targeting system of FIG. 2 as it overlays the monitor and first person shooter game depicted in FIG. 1.

The present technology provides enhanced targeting for first person shooter video games. In certain methods of use, the present technology provides players with a decisive advantage during game play, in both accuracy and speed. With reference to FIG. 1, first person shooter games traditionally give the player only one frame of reference to determine where targets 2 are located and where the weapon 4 is aimed, and that is the reticule 6.

With reference to FIG. 4, various embodiments of the present technology provide the player with maximum frame of reference by giving the player an enhanced reticule 10 that has a horizontal line 12 running the width of the television screen 14, and a vertical line 16 running the height of the television screen 14, with both lines intersecting at the reticule point 18. Instead of the enhanced reticule 10 being just a small circle, the enhanced reticule 10 now comprises, in some embodiments, a vertical axis and a horizontal axis, with a circle, or other graphical focal point, at the center (reticule point 18). In some embodiments, the lines and the circle are transparent enough (if made as a "ghost" line or band) or unobtrusive enough (if made as a narrow solid line) as to not obstruct the players view of the game environment. Having a vertical line 16 and horizontal line 12 or band extending from the reticule point 18 to the edges of the television screen 14 creates a calming effect on the player's eye, allowing the player to not have to focus so intently on the reticule 6, giving the player a greater ability to locate and acquire other targets 2 in the game environment. This calming effect occurs because the player can relate the target 2 to a key additional reference point (the vertical line 16 or horizontal line 12 or band), other than the centrally located reticule 6.

In various embodiments, the reticule point 18, horizontal line 12 and vertical line 16 will not disappear or blend in with the game environment. The horizontal line 12 and vertical line 16, extending from the reticule point 18, provide the player with maximum frame of reference between the target 2 and where the weapon 4 is pointed. As stated previously, particularly with larger televisions, the target 2 and the reticule 6 can be far enough away from each other that the player actually can't see them both at the same time. Horizontal line 12 and vertical line 16 extending between the edges of the screen ensuring that, no matter where the target 2 is, the player will always know where the reticule 6. This is due to the fact that the horizontal line 12 and vertical line 16 are never outside of the players view.

The horizontal line 12 and vertical line 16 also help the player move the reticule 6 onto the target 2 faster because the player doesn't have to constantly look back and forth between the reticule 6 and the target 2 until finally getting the reticule 6 on the target 2. When the player locates the target 2, anywhere on the screen 14, the player will also be able to see at least one of the horizontal line 12 or vertical line 16. The player can then simply move the nearest line onto the target 2, and move the horizontal line 12 or vertical line 16 until the reticule 6 is on the target 2. This is especially helpful when the target 2 is moving. Players can move one of the horizontal line 12 or vertical line 16 onto the moving target 2, and track the moving target 2 until the reticule 6 is on the target 2. The shortest distance between two points is a straight line, and this technology gives the player greater ability to move the reticule 6 onto the target 2 in a much straighter line, cutting down the distance the reticule 6 has to move, effectively cutting down the time it takes to acquire the target 2. The length and width of the horizontal line 12, vertical line 16, and the circle will vary depending on the size of the television screen. The color of the horizontal line 12, and vertical line 16, and the circle can also vary depending on the players preference. Because the key elements of the present technology never disappear, players will always have a reticule point 18 on the screen, even when the player is running, or when the reticule 6 provided by the game blends in with the game environment.

The elements of the present technology can be applied to the television screen 14 mechanically or electronically. In some embodiments where this is done electronically, an electronic device is situated between the gaming console or computer, and the television screen 14 or monitor. In one embodiment, the horizontal line 12 and vertical line 16 are lines of light projected onto the video monitor by a projector that is positioned in front of the video monitor. In another embodiment, the lines of light are provided in a color other than white. In yet another embodiment, the projector includes a color selector that may be actuated to change the color of the lines of light between a plurality of predetermined colors. In still another embodiment, the horizontal line 12 and vertical line 16 extend completely across the respective horizontal and vertical axis of a visible display of the video monitor or television screen 14. Other electronic means of applying the present invention to a first person shooter may be used, such as electronically adding the horizontal line 12 and vertical line 16 to the video feed received by the television screen 14.

Various embodiments of the present technology mechanically associate the enhanced reticule with the television screen 14. In some such embodiments, a piece of clear, thin-film material 20 is cut to the same or similar dimensions as the television screen 14, with the key graphical design elements of the present technology screen printed on the piece of thin-film material 20. The thin-film material 20 would be provided, in various embodiments, include various materials (such as various thin-film plastics) and in dimensions that take advantage of static electricity adjacent the television screen 14, which will hold the film in place. In other embodiments, the thin-film material 20 may be held in place by other means, such as a pressure sensitive adhesive, brackets, or other appropriate means.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. In combination with a video monitor and an electronic gaming system, operative to display a first-person shooter game on the video monitor:
   a targeting system including:
      a transparent film that is mechanically coupled with the video monitor; and
      a targeting reticule comprising: (i) a horizontal sight line having a length extending across a width of the video monitor positioned closely adjacent a left edge and a right edge of the video monitor; and (ii) a vertical sight line having a length extending across a height of the video monitor positioned closely adjacent to a top edge and a bottom edge of the video monitor;
   wherein the length of the horizontal sight line is greater than the length of the vertical sight line; and
   wherein the horizontal sight line and vertical sight line of the targeting reticule are positioned with respect to one another and the video monitor such that the horizontal sight line and vertical sight line intersect at a targeting point; the targeting point positioned at a center point of the video monitor; whereby the center point may be moved from a position away from a target displayed on the video monitor to a position at least partially over the target by manipulating a controller of the electronic gaming system so that the target is moved along at least one of the horizontal sight line and the vertical sight line until the target is at least partially beneath the center point.

2. The targeting system of claim 1 wherein the film is mechanically coupled with the video monitor using pressure sensitive adhesive.

3. The targeting system of claim 1 wherein the film is mechanically coupled with the video monitor using one or more brackets.

4. The targeting system of claim 1 wherein the horizontal sight line and vertical sight line extend completely across the respective horizontal and vertical axis of a visible display of the video monitor.

\* \* \* \* \*